Figure 1:
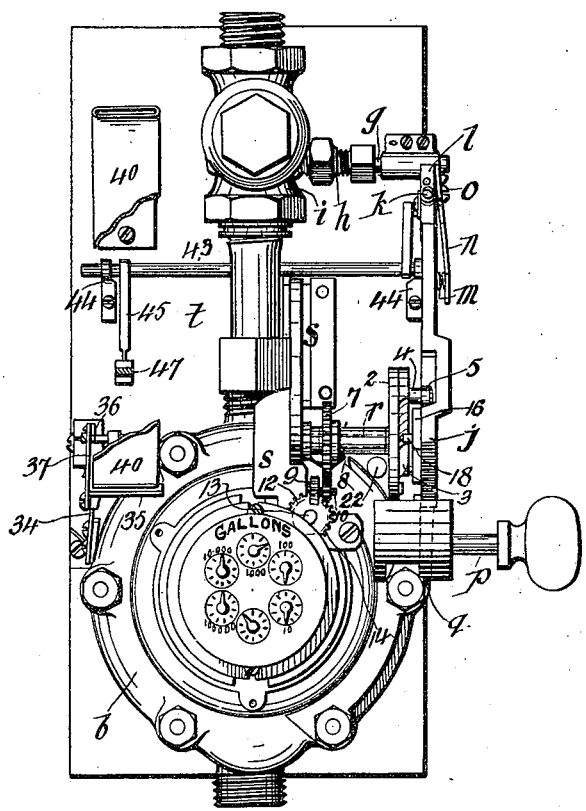

No. 667,818. Patented Feb. 12, 1901.
J. A. I. CRAIG & C. PAGE.
COIN CONTROLLED METER.
(Application filed July 30, 1900.)

(No Model.) 2 Sheets—Sheet 1.

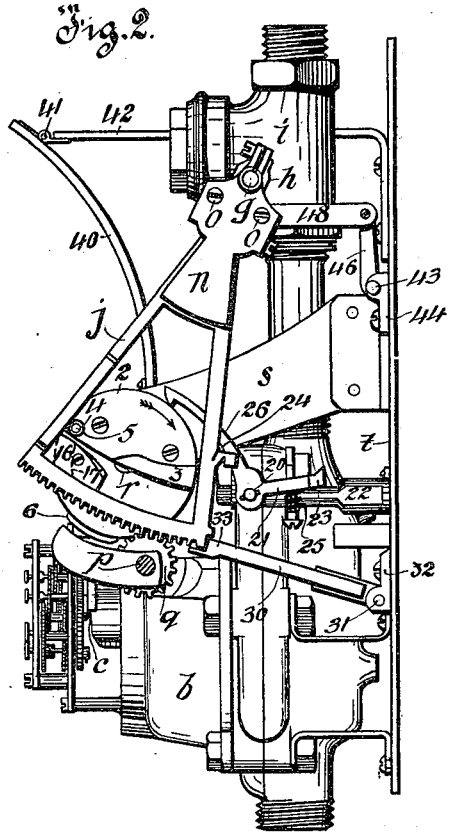

UNITED STATES PATENT OFFICE.

JOSEPH AMBROISE ISAÏE CRAIG AND CHARLES PAGE, OF MONTREAL, CANADA, ASSIGNORS OF ONE-THIRD TO LOUIS BEDARD; SAID CRAIG ASSIGNOR OF HIS RIGHT TO MARIE MARGUERITE PHILOMENE CRAIG, OF SAME PLACE.

COIN-CONTROLLED METER.

SPECIFICATION forming part of Letters Patent No. 667,818, dated February 12, 1901.

Application filed July 30, 1900. Serial No. 25,362. (No model.)

*To all whom it may concern:*

Be it known that we, JOSEPH AMBROISE ISAÏE CRAIG, inventor, and CHARLES PAGE, machinist, of the city of Montreal, in the district of Montreal and Province of Quebec, Canada, have invented certain new and useful Improvements in Coin-Controlled Meters; and we do hereby declare that the following is a full, clear, and exact description of the same.

Our invention relates particularly to water-meters, although it may be applied with advantage to any device for measuring and controlling the flow of a fluid, whether liquid or gaseous.

The object of our invention is to provide a coin-controlled measuring device that will be positively locked when the water is shut off and the hand-actuated portion of the valve-operating gear whereof which opens the valve will be automatically thrown and held out of operative connection with the valve from the time the water begins to flow until the predetermined quantity will have passed through the meter and the valve automatically closed.

To this end the invention may be said, briefly, to consist in combining with a meter of ordinary type a coin-controlled locking device of novel construction and the function whereof is to cause the weight of a coin to unlock valve-actuating mechanism and enable it to be manipulated to open the valve and allow the water to flow through the meter until a predetermined quantity automatically recorded by our improved attachment has passed through the meter, when our improved attachment will automatically close and lock the valve, which can then be unlocked and opened only after an additional coin has been paid into the attachment.

For full comprehension, however, of our invention reference must be had to the accompanying drawings, forming a part of this specification, wherein like symbols indicate the same parts, and in which—

Figure 1 is a front view of a water-meter of ordinary type with the casing broken away and illustrating our improved attachment in front elevation. Fig. 2 is a right-hand side elevation thereof, and Fig. 3 is a left-hand side elevation thereof.

The casing $b$ of the meter proper contains measuring mechanism of ordinary type, and as it forms no part of our invention it will not be hereinafter described. The spindle $c$ of this measuring mechanism projects, as usual, through the casing $b$ and is operatively connected, also as usual, by a pinion $d$ to the actuating-train of gears of the ordinary recording-dials $e$.

The valve $f$ for controlling the flow of water into the meter is of flap-valve form, and its oscillatory stem $g$ projects through a stuffing-box $h$, carried rigidly by the valve-casing $i$ and constituting a bearing to support said stem. A lever $j$ in the form of a quadrantal gear is hinged, as at $k$, to a hanger-plate $l$, mounted rigidly upon the end of the valve-stem, and an expansile helical spring $m$ bears between this quadrantal gear and a bearing-plate $n$, secured by a pair of screws $o$ to the hanger-plate. A spindle $p$ is mounted near the forward end of this quadrantal gear when the latter is in its swung-back position, and has a pinion $q$ mounted rigidly thereon in a position to intermesh with the teeth of said quadrantal gear when in the position it will assume when the spring $m$ is expanded.

The valve $f$ is secured upon its stem in an angular position relatively to its seat to cause the inlet-port to be full open when the quadrant is swung fully back, and obviously the movement of the quadrant to its forward position will move the valve to close the inlet-port. This movement of the quadrant and the locking thereof in its rear and forward positions are effected by the following means: A spindle $r$ is rotatably mounted at one end in an angular bracket $s$, secured rigidly at one end to the frame-plate $t$ and at its other end to the meter-casing $b$. A cam-disk 2 is carried rigidly upon the other end of this spindle, and one-half thereof is diminished in thickness and half of the diametrical edge of the thickest portion beveled or sheared off toward said portion of less thickness to provide a cam-rise 3. A pin projection 4, provided with an antifriction-roller 5, is carried by the face of the thicker half of the disk, near the end of the unbeveled half of the diametrical edge thereof, and a rise 6 is formed on the periphery of the disk, about midway of the circumferential line of the thinner half of the disk. A pinion 7 is mounted rigidly upon the spindle $r$ and intermeshes with the smaller of a pair of different-sized pinions 8 and 9, respectively, mounted rigidly upon a spindle 10, carried rotatably in the vertical portion of the angular bracket $s$. The larger, 9, of these pinions intermeshes with a worm 12, rigidly mounted upon a spindle 13, upon the outer end whereof a pinion 14 is carried and intermeshes with an idler 15, which in turn intermeshes with the pinion $d$ for actuating the train of gears of the meter's recorder. The side of the quadrant adjacent to the cam-disk 2 carries a grooved plate 16, the groove 17 whereof receives the pin projection 4 as the disk rotates in the direction indicated in Fig. 2, while a pin projection 18 upon this plate bears yieldingly (through the action of spring $m$) upon the face of the cam-disk to receive movement therefrom against said spring. The means for locking the quadrant in its full-back position is actuated by the peripheral cam-rise 6, and consists of a bell-crank lever fulcrumed, as at 20, to a bracket-arm 22, secured rigidly to the back plate $t$, and one arm 21 thereof is formed with a rigid locking-pawl 23, adapted to at times engage a notch in a rigid projection 24 upon the rear side of the quadrant. An expansile helical spring 25 bears between this lever-arm 21 and a projection from said bracket-arm 22 and constantly maintains said bell-crank lever yieldingly in a position to have its locking-pawl 23 engage the notch in the projection 24 upon the quadrant, while at the same time the other arm 26 of this bell-crank lever will be yieldingly held in a position to be engaged by the peripheral rise 6 and oscillated to at the proper time disengage said locking-pawl from and release the quadrant. The quadrant is locked in its forward position and unlocked when the coin is deposited by means of a lever-arm 30, secured rigidly at its rear end upon a spindle 31, mounted in bearings 32 upon the back plate $t$, said lever-arm being of sufficient length to have its forward end 33, which is of bayonet form, receive the rear end of the quadrant when it is in its forward position, thereby locking said quadrant in such position. A lever-arm 34 is secured rigidly at its rear end to the opposite end of the spindle 31 and has its forward end offset and flattened, as at 35, to support the coin, as will be presently shown, a weighted lever 36 being connected by a link 37 to this coin-supporting lever 34 to normally hold it yieldingly in its elevated position and the locking lever-arm 30 yieldingly in a position to engage the quadrant.

The coin-throat 40 is hinged at its upper end, as at 41, to the end of a bracket-arm 42, secured to the back plate $t$. A spindle 43, mounted in bearings 44 on the back plate, and a pair of lever-arms 45 and 46, respectively, rigidly mounted upon its opposite ends, constitute a bell-crank lever, the arm 45 whereof is pivotally connected by a link 47 to the throat, and the arm 46 is pivotally connected by a link 48 to the quadrant. This arrangement enables the quadrant to automatically adjust the throat to positions to either have its lower end immediately over and obstructed by the coin-support to cause a coin dropped in the throat to rest thereupon or to have its lower end clear of said coin-support to allow the coin to fall from the throat.

The pinion 7 is, in the proportion illustrated relatively to the other gears of the train, of a diameter to allow a tooth for each twelve and one-half imperial gallons of water supplied, and obviously if it is desired that a greater or less quantity of water be supplied for the value of the coin necessary to operate the locking device this gear 7 will have to be replaced by a gear with a greater or less number of teeth. Consequently this gear acts as a means to reckon the gallons as they pass through the meter.

The casing for inclosing the meter and our improved attachment may be of any approved design, and as it does not enter into our invention it has been neither illustrated nor described.

The operation of starting and of automatically shutting off the flow of water through a meter by our improved attachment is as follows: A coin (in the present instance a twenty-five-cent piece) dropped into the throat will with the parts in the positions shown in full lines rest upon the coin-support and simultaneously depress it and the locking-lever 30, thus freeing the quadrant. Upon the crank being then turned the quadrant will be swung to its full-back position, thus raising the flap-valve $f$ and allowing the water to flow through the meter. Simultaneously the throat will be moved to a position with its open lower end clear of the coin-support and the locking-pawl will engage the ratchet-block upon the quadrant and lock the latter in said full-back position. Immediately the water begins to flow the cam-disk in its rotation (through the train of gears, including the reckoning-gear, that operatively connect the recording-dial mechanism to the said cam-disk) will swing the quadrant on its hinge out of mesh with its operating-pinion. The water will continue to flow in full volume until the peripheral rise upon the cam-disk moves the locking-pawl out of locking engagement with the ratchet-block upon the quadrant and the pin projection on the face of the disk engages the quadrant and commences to swing it forward, thus commencing to close the valve. The cam-disk continuing to rotate will swing the quadrant to its extreme forward position, and as the pin projection issues from the groove and releases the quadrant the abrupt fall in the face of the cam-disk will allow the expansile spring *m* to throw the quadrant into engagement with the pinion and simultaneously the locking-lever will engage the rear end of the quadrant and lock it in its extreme forward position, to be released only by dropping another coin.

If an unscrupulously-inclined person should attempt to tamper with the valve-locking gear through the crank-spindle and in so doing should not return the quadrant to its fullback position with a view to preventing the fall of the coin from its support (and the consequent locking of the valve) to secure more water than he is entitled to, he will have to tie or otherwise hold the crank-handle against the water-pressure upon the valve. The water will then flow until the facial rise of the cam-disk will reach the quadrant, when said quadrant will be thrown out of mesh with its pinion and the valve immediately closed by the water-pressure.

What we claim is as follows:

1. In a fluid-meter, the combination with a valve for controlling the flow of a liquid, of means for automatically closing said valve and locking same in its closed position when a predetermined quantity of fluid has passed therethrough, means for opening said valve, and means for automatically disengaging the valve-opening means from the valve from the time the valve is opened until it is closed for the purpose set forth.

2. The combination with a valve for controlling the flow of a liquid, of means for automatically closing said valve and locking same in its closed position when a predetermined quantity of fluid has passed therethrough, coin-controlled means for unlocking said valve, means for opening said valve, and means for automatically disengaging the valve-opening means from the valve from the time the valve is opened until it is closed for the purpose set forth.

3. The combination with a valve for controlling the flow of a fluid, of a lever operatively connected at one end to said valve; a spindle mounted adjacent to said lever; means actuated by the flowing fluid for rotating said spindle; a cam-disk carried rigidly by said spindle and having a projection to engage and move said lever to close said valve; means for automatically locking said lever in its position with the valve closed; coin-actuated mechanism for unlocking said lever, means for moving said lever to open said valve, and means for at intervals automatically disengaging said last-mentioned lever-moving means from said lever.

4. The combination with a valve for controlling the flow of a fluid, of a lever operatively connected at one end to said valve; a spindle mounted adjacent to said lever; means actuated by the flowing fluid for rotating said spindle; a cam-disk carried rigidly by said spindle and having a projection to engage and move said lever to close said valve; a locking lever-arm for automatically locking said valve-actuating lever in its position with the valve closed; a movable coin-guiding throat; coin-actuated mechanism for unlocking said lever consisting of a suitably-mounted oscillatory spindle; a lever-arm secured rigidly at one end to said spindle and having its other end projecting beneath said throat when the latter is in its rearward position and formed with a coin-support to obstruct the passage through said throat when in said position, said locking lever-arm being secured rigidly at one end to the other end of said spindle and projecting toward said valve-actuating lever and engaging same in its position with the valve closed; means actuated by said lever for moving said throat away from said coin-support; and means for moving said lever to open said valve, substantially as described.

5. The combination with the oscillating valve-stem of a flap-valve for controlling the flow of a fluid; of a quadrantal gear; means for connecting said quadrantal gear to said valve-stem to oscillate therewith; a spindle rotatably mounted adjacent to said lever; a spindle mounted adjacent to said quadrantal gear; means actuated by the flowing fluid for rotating said spindle; a cam-disk carried rigidly by said spindle and having a projection to engage and move said quadrantal gear to close said valve; means for automatically locking said quadrantal gear in its position with the valve closed; coin-actuated mechanism for unlocking said quadrantal gear; and means for moving said quadrantal gear to open said valve consisting of a spindle mounted adjacent to the teeth of said gear, a pinion mounted rigidly upon said last-mentioned spindle and intermeshing with said quadrantal gear, and a crank-handle for rotating said last-mentioned spindle, substantially as described.

6. The combination with the oscillating valve-stem of a flap-valve for controlling the flow of a fluid; a plate rigidly mounted upon said stem, a quadrantal gear hinged to said plate; a spindle mounted adjacent to said quadrantal gear; means actuated by the flowing fluid for rotating said spindle; a cam-disk carried rigidly by said spindle and having a projection to engage and move said quadrantal gear to close said valve; means for automatically locking said quadrantal gear in its position with the valve closed; coin-actuated mechanism for unlocking said quadrantal gear and means for moving said quadrantal gear to open said valve consisting of a spindle mounted adjacent to the teeth of said gear, a pinion mounted rigidly upon said last-mentioned spindle and intermeshing with said quadrantal gear, and a crank-handle for rotating said last-mentioned spindle, and means for swinging said quadrant upon its hinge to at intervals make or break its operative connection with the last-mentioned pinion, substantially as described.

7. The combination with the oscillating valve-stem of a flap-valve for controlling the flow of a fluid; a plate rigidly mounted upon said stem, a quadrantal gear hinged to said plate; a spindle rotatably mounted adjacent to said lever; a spindle mounted adjacent to said quadrantal gear; means actuated by the flowing fluid for rotating said spindle; a cam-disk carried rigidly by said spindle and having a projection to engage and move said quadrantal gear to close said valve; means for automatically locking said quadrantal gear in its position with the valve closed; coin-actuated mechanism for unlocking said quadrantal gear; and means for moving said quadrantal gear to open said valve consisting of a spindle mounted adjacent to the teeth of said gear, a pinion mounted rigidly upon said last-mentioned spindle and intermeshing with said quadrantal gear, and a crank-handle for rotating said last-mentioned spindle, and means for swinging said quadrant upon its hinge to at intervals make or break its operative connection with the last-mentioned pinion, consisting of a facial cam upon said cam-disk and a spring carried by said hinge-plate to cause said quadrant to yieldingly bear upon said cam-disk, substantially as described.

In testimony whereof we have affixed our signatures in presence of two witnesses.

JOSEPH AMBROISE ISAÏE CRAIG.
CHARLES PAGE.

Witnesses:
WILLIAM P. McFEAT,
ARTHUR H. EVANS.